United States Patent
Milschewski et al.

(10) Patent No.: US 10,564,282 B2
(45) Date of Patent: Feb. 18, 2020

(54) METHOD FOR IMPROVING A DETECTION OF AT LEAST ONE OBJECT IN SURROUNDINGS OF A MOTOR VEHICLE BY WAY OF AN INDIRECT MEASUREMENT BY SENSORS, CONTROLLER, DRIVER ASSISTANCE SYSTEM, AND MOTOR VEHICLE

(71) Applicant: VALEO Schalter und Sensoren GmbH, Bietigheim-Bissingen (DE)

(72) Inventors: Tino Milschewski, Bietigheim-Bissingen (DE); Jean-Francois Bariant, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/084,518

(22) PCT Filed: Aug. 5, 2016

(86) PCT No.: PCT/EP2016/068797
§ 371 (c)(1),
(2) Date: Sep. 12, 2018

(87) PCT Pub. No.: WO2017/157483
PCT Pub. Date: Sep. 21, 2017

(65) Prior Publication Data
US 2019/0079188 A1 Mar. 14, 2019

(30) Foreign Application Priority Data

Mar. 18, 2016 (DE) .................. 10 2016 105 022
Mar. 18, 2016 (DE) .................. 10 2016 105 023

(51) Int. Cl.
*G01S 15/93* (2006.01)
*G01S 15/931* (2020.01)
(Continued)

(52) U.S. Cl.
CPC .......... *G01S 15/931* (2013.01); *G01S 15/025* (2013.01); *G01S 15/46* (2013.01); *G01S 15/878* (2013.01);
(Continued)

(58) Field of Classification Search
None
See application file for complete search history.

(56) References Cited

U.S. PATENT DOCUMENTS

| 4,278,142 A | * | 7/1981 | Kono | ................... G05D 1/0234 180/168 |
| 5,220,508 A | * | 6/1993 | Ninomiya | ............. G01S 3/7864 180/168 |

(Continued)

FOREIGN PATENT DOCUMENTS

WO 2013/071190 A1 5/2013

OTHER PUBLICATIONS

International Search Report issued in PCT/EP2016/068797 dated Dec. 6, 2016 (3 pages).

(Continued)

*Primary Examiner* — Curtis J King
(74) *Attorney, Agent, or Firm* — Osha Liang LLP

(57) ABSTRACT

The invention relates to a method for detecting at least one object (3) in surroundings (4) of a motor vehicle (1), in which a first sensor (6) is actuated to emit a sensor signal, sensor data are received from a second sensor (6), which describe the sensor signal reflected from the at least one object (3), a fuzzy feature ($x_U$) is determined from the sensor data as an object feature ($x_P$, $x_L$, $x_U$) for describing the at (Continued)

least one object (3), wherein the fuzzy feature ($x_U$) describes a distance between the at least one object (3) and the first sensor (6) and a distance between the at least one object and the second sensor (6), wherein the fuzzy feature ($x_U$) is described as an ellipse ($x_E$), a further object feature ($x_P$, $x_L$), which describes the at least one object (3), is determined on the basis of sensor data of at least one further measurement of the first and/or the second sensor (6), the further object feature ($x_P$, $x_L$) and the fuzzy feature ($x_U$) are transferred using an innovation function (h) into a common state space, wherein the innovation function (h) describes a similarity between the fuzzy feature ($x_U$) and the further object feature ($x_P$, $x_L$), and a merged object feature is determined from the further object feature ($x_P$, $x_L$) on the basis of the innovation function (h).

15 Claims, 4 Drawing Sheets

(51) Int. Cl.
   *G01S 15/02*   (2006.01)
   *G01S 15/46*   (2006.01)
   *G01S 15/87*   (2006.01)
(52) U.S. Cl.
   CPC ... *G01S 2015/465* (2013.01); *G01S 2015/938* (2013.01)

(56) References Cited

U.S. PATENT DOCUMENTS

| | | | | |
|---|---|---|---|---|
| 5,281,949 A * | 1/1994 | Durley | ............... | B60Q 1/50 180/167 |
| 5,345,675 A * | 9/1994 | Yamanaka | ............... | B25J 9/1697 29/468 |
| 5,493,269 A * | 2/1996 | Durley | ............... | B60Q 1/50 180/167 |
| 5,638,116 A * | 6/1997 | Shimoura | ............... | G05D 1/0246 348/118 |
| 5,660,454 A * | 8/1997 | Mori | ............... | B60Q 1/085 362/466 |
| 5,752,214 A * | 5/1998 | Minowa | ............... | B60K 31/0008 701/111 |
| 5,796,350 A * | 8/1998 | Fuse | ............... | B60K 35/00 340/439 |
| 6,198,987 B1 * | 3/2001 | Park | ............... | G07B 15/063 340/928 |
| 6,218,960 B1 * | 4/2001 | Ishikawa | ............... | G08G 1/167 340/435 |
| 6,219,600 B1 * | 4/2001 | Pochmuller | ............... | B60G 17/0162 180/167 |
| 7,038,577 B2 * | 5/2006 | Pawlicki | ............... | B60W 30/18 340/435 |
| 7,944,362 B2 * | 5/2011 | Hue | ............... | G06T 7/0008 340/438 |
| 9,381,916 B1 * | 7/2016 | Zhu | ............... | B60W 30/0956 |
| 2005/0041529 A1 * | 2/2005 | Schliep | ............... | G01S 7/539 367/99 |
| 2006/0006988 A1 * | 1/2006 | Harter, Jr. | ............... | B60Q 9/008 340/435 |
| 2006/0164514 A1 * | 7/2006 | Muramatsu | ............... | B60R 1/00 348/207.99 |
| 2007/0173983 A1 * | 7/2007 | Takahashi | ............... | B60R 1/00 701/1 |
| 2008/0195261 A1 * | 8/2008 | Breed | ............... | B60R 21/0132 701/2 |
| 2008/0211652 A1 * | 9/2008 | Cope | ............... | B60K 35/00 340/461 |
| 2008/0300755 A1 * | 12/2008 | Madau | ............... | B60R 1/00 701/49 |
| 2009/0143967 A1 * | 6/2009 | Lee | ............... | B60R 1/00 701/119 |
| 2009/0292468 A1 | 11/2009 | Wu et al. | | |
| 2011/0018699 A1 * | 1/2011 | Chen | ............... | B60Q 9/008 340/435 |
| 2011/0084852 A1 * | 4/2011 | Szczerba | ............... | G01C 21/3626 340/905 |
| 2012/0072080 A1 * | 3/2012 | Jeromin | ............... | B60Q 1/143 701/49 |
| 2012/0116659 A1 * | 5/2012 | Yuasa | ............... | G08G 1/096775 701/118 |
| 2013/0162461 A1 | 6/2013 | Lucking et al. | | |
| 2015/0193885 A1 * | 7/2015 | Akiva | ............... | G06Q 40/08 705/4 |
| 2017/0108865 A1 * | 4/2017 | Rohde | ............... | G06K 9/00845 |

OTHER PUBLICATIONS

Cheng, H. [et al.]: Interactive Road Situation Analysis for Driver Assistance and Safety Warning Systems: Framework and Algorithms. In: IEEE Transactions on Intelligent Transportation Systems, vol. 8, No. 1, Mar. 2007 (11 pages).

* cited by examiner

METHOD FOR IMPROVING A DETECTION OF AT LEAST ONE OBJECT IN SURROUNDINGS OF A MOTOR VEHICLE BY WAY OF AN INDIRECT MEASUREMENT BY SENSORS, CONTROLLER, DRIVER ASSISTANCE SYSTEM, AND MOTOR VEHICLE

The present invention relates to a method for detecting at least one object in surroundings of a motor vehicle, in which a first sensor is actuated to emit a sensor signal, sensor data are received from a second sensor, which describe the sensor signal reflected from the at least one object, a fuzzy feature is determined from the sensor data as an object feature to describe the at least one object, wherein the fuzzy feature describes a distance between the at least one object and the first sensor and a distance between the at least one object and the second sensor. Moreover, the invention relates to a controller and a driver assistance system for a motor vehicle. Finally, the invention relates to a motor vehicle.

Different methods are known from the prior art, using which objects in the surroundings of a motor vehicle can be detected. For example, the objects can be recognized with the aid of corresponding sensors, for example ultrasound sensors, radar sensors, laser sensors, or cameras. Furthermore, determining a distance between the motor vehicle and the object and/or a relative position between the motor vehicle and the object on the basis of the sensor signals of the sensors is known.

In particular in conjunction with ultrasound sensors, it is known that an object can be determined with the aid of an indirect measurement. For this purpose, a first ultrasound sensor emits an ultrasonic signal. This ultrasonic signal is reflected at the object and received by a second ultrasound sensor. A distance of the object to the first sensor and the second sensor can be determined on the basis of the runtime between the emission of the ultrasonic signal by the first sensor and the reception of the ultrasonic signal reflected from the object by the second sensor. For example, it can be assumed for simplification that the object is located on a circle, wherein the centre point of the circle is arranged in the middle between the two sensors or the positions of the two sensors. An item of angle information with respect to the object cannot be derived from such an indirect measurement, however.

In addition, fusing the results of multiple or different sensors, to be able to detect objects more reliably, is known from the prior art. For this purpose, it can be provided, for example, that an object feature, which describes the object, is determined in each case from the sensor data which are provided by the respective sensor. Such an object feature can be, for example, a point feature or a line feature, which describes the object or a part thereof. A spatial uncertainty or fuzziness can also be determined for the object feature. The object features can also be entered in a digital surroundings map, which describes the surroundings of the motor vehicle. The object features can be merged to fuse the measurements of the various sensors.

It is an object of the present invention to disclose a solution as to how a detection of objects in surroundings of a motor vehicle can be improved in the case of an indirect measurement by sensors of the motor vehicle.

This object is achieved according to the invention by a method, by a controller, by a driver assistance system, and by a motor vehicle having the features according to the respective independent claims. Advantageous refinements of the present invention are the subject matter of the dependent claims.

In one embodiment of a method for detecting at least one object in surroundings of a motor vehicle, preferably a first sensor is actuated to emit a sensor signal. Furthermore, sensor data are received in particular from a second sensor, which describe the sensor signal reflected from the at least one object. Furthermore, it is preferably provided that a fuzzy feature is determined from the sensor data as an object feature for describing the at least one object, wherein the fuzzy feature describes a distance between the at least one object and the first sensor and a distance between the at least one object and the second sensor. In particular, the fuzzy feature is described as an ellipse. Moreover, in particular on the basis of sensor data of at least one further measurement of the first and/or the second sensor, a further object feature is determined, which describes the at least one object. The further object feature and the fuzzy feature are transferred in particular using an innovation function into a common state space, wherein the innovation function describes a similarity between the fuzzy feature and the further object feature. Furthermore, a merged object feature is preferably determined from the further object feature on the basis of the innovation function.

A method according to the invention serves for detecting at least one object in surroundings of a motor vehicle. In the method, a first sensor is actuated to emit a sensor signal. Moreover, sensor data are received from a second sensor, which describe the sensor signal reflected from the at least one object. A fuzzy feature is determined from the sensor data as an object feature for describing the at least one object, wherein the fuzzy feature describes a distance between the at least one object and the first sensor and a distance between the at least one object and the second sensor. In this case, the fuzzy feature is described as an ellipse. Moreover, on the basis of sensor data of at least one further measurement of the first and/or the second sensor, a further object feature is determined, which describes the at least one object. The further object feature and the fuzzy feature are transferred using an innovation function into a common state space, wherein the innovation function describes a similarity between the fuzzy feature and the further object feature. Finally, a merged object feature is determined from the further object feature on the basis of the innovation function.

One or more objects in the surroundings of the motor vehicle are to be detected and/or recognized with the aid of the method. The method can be carried out, for example, using a controller or an electronic control unit of the motor vehicle. Using the controller, a first sensor of the motor vehicle can be actuated such that the first sensor emits a sensor signal as a result of the actuation. This emitted sensor signal is then incident on the at least one object and is reflected therefrom. The reflected sensor signal or the echo of the sensor signal is then received by the second sensor. The first and the second sensor can be ultrasound sensors. When the second sensor has received the reflected ultrasonic signal, it provides sensor data which are transmitted to the controller. These sensor data can comprise, for example, multiple sensor values and/or measured values, which describe the reflected sensor signal. A runtime can be determined with the aid of the controller on the basis of the runtime between the emission of the sensor signal by the first sensor and the reception of the reflected sensor signal by the second sensor. It can be ascertained on the basis of this runtime how far away the object is from the first sensor and the second sensor. Furthermore, it is provided that a fuzzy feature or a fuzzy object feature, which serves to describe the object, is determined with the aid of the controller.

Such a fuzzy feature represents an object feature for describing the object. The fuzzy feature results, for example, in that only items of distance information with respect to the object can be derived on the basis of the sensor data or the runtime of the sensor signal. The fuzzy feature describes a distance between the first sensor and the object and a distance between the second sensor and the object. Items of angle information with respect to the object cannot be derived from the sensor data. The relative position between the sensors and the object thus cannot be determined precisely. The fuzzy feature can be entered, for example, in a digital surroundings map, which describes the surroundings of the motor vehicle. In this case, the fuzzy feature can also be entered with a spatial uncertainty or a fuzziness in the surroundings map. Further object features can also be entered in this surroundings map. These object features can have been determined, for example, from measurements by other sensors of the motor vehicle. It can also be provided that further object features have already been determined by the first and/or the second sensor.

It is provided according to the invention that the fuzzy feature is described as an ellipse. Furthermore, a further object feature which describes the at least one object is determined on the basis of sensor data of at least one further measurement of the first and/or the second sensor, and the fuzzy feature is merged with the object feature. Such an object feature can be, for example, a point or a point feature, which describes a position of the object or a part thereof in space. The object feature can also be a line or a line feature, which describes a border of an object or a part thereof. Such object features are to be merged with the fuzzy feature or the ellipse, in order to be able to characterize the object in the surroundings in greater detail. Furthermore, the further object feature and the fuzzy feature are transferred using an innovation function into a common state space, wherein the innovation function describes a similarity between the object feature and the fuzzy feature and the merged object feature is determined from the object feature on the basis of the innovation function. The further object feature and the fuzzy feature can be transferred and/or transformed into a common state space. This state space can represent, for example, a common coordinate system for the further object feature and the fuzzy feature. In particular, the state space can be different from the surroundings map. A state of the further object feature and a state of the fuzzy feature can be described in the state space. The innovation function, which can represent a degree of similarity for determining a similarity between the further object feature and the fuzzy feature, is also determined in this state space. In particular, the innovation function can describe how similar the state of the further object feature is to the state of the fuzzy feature. With the aid of the innovation function, the respective states of the further object feature and the fuzzy feature can be represented such that only the states and/or dimensions are taken into consideration which are also of interest for the determination of the similarity. For example, the innovation function can describe a distance between the further object feature and the fuzzy feature or a difference with respect to the orientation of the further object feature and the fuzzy feature. It can firstly be determined on the basis of the innovation function whether the fuzzy feature can be associated with the further object feature. If the association has taken place, the innovation function can also be used for the purpose of deriving the merged object feature from the further object feature. Therefore, the object can be detected, on the one hand, by at least one direct measurement, which is carried out by the first and/or second sensor, and, on the other hand, by an indirect measurement, which is carried out by the first and the second sensor. For example, the object can firstly be determined on the basis of multiple direct and/or indirect measurements and entered in a digital surroundings map. Such an object can thereafter be fused with an indirect measurement and thus improved. The results of the measurements can be unified by the innovation function and the recognition of the object can thus be improved.

Focal points of the ellipse are preferably determined on the basis of a position of the first sensor and the second sensor, a length of a semi-major axis of the ellipse is determined on the basis of a runtime of the sensor signal and a length of a semi-minor axis of the ellipse is determined on the basis of the focal points and the length of the semi-major axis. The positions or installation positions of the first sensor and the second sensor are known. They can be stored, for example, in a memory of the controller. The ellipse is determined such that the respective positions of the first sensor and the second sensor are associated with the two focal points of the ellipse. Furthermore, the length of the semi-major axis of the ellipse is determined on the basis of the runtime of the sensor signal. It is presumed for this purpose that the object from which the sensor signal was reflected is located on the ellipse. The runtime of the sensor signal describes the path from a first focal point to the point on the ellipse which describes the object, plus the path from this point to a second focal point. The route which can be associated with the runtime thus corresponds to twice the semi-major axis or the length of the major axis of the ellipse. The length of the semi-minor axis can be derived from the position of the focal points and the length of the semi-major axis. The ellipse can thus be ascertained in a simple manner on the basis of the known positions of the sensors and the runtime which is determined from the sensor signal. Because the fuzzy feature is described in the case of the indirect measurement using the sensors as an ellipse and not as a circle, a more accurate item of information about the position of the object can be provided. This overall enables a more accurate and more reliable detection of the at least one object.

An eccentricity of the ellipse is preferably determined on the basis of a distance of the focal points and the length of the semi-minor axis is determined from the length of the semi-major axis and the eccentricity. Since the respective positions or installation positions of the two sensors are known, the distance between the first sensor and the second sensor can also be determined. Half of this distance can also be referred to as the eccentricity of the ellipse. The length of the semi-minor axis of the ellipse can then be determined from this eccentricity and the length of the semi-major axis of the ellipse. The length of the semi-minor axis of the ellipse results from the square root of the length of the semi-major axis squared minus the eccentricity squared. The length of the semi-minor axis of the ellipse, which describes the fuzzy feature, can thus be determined in a simple manner and within a short computing time.

In a further embodiment, the further object feature is determined and entered in a digital surroundings map, which describes the surroundings of the motor vehicle, and subsequently the fuzzy feature is determined and entered in the digital surroundings map. It can be the case that the object feature has already been entered in the surroundings map. Subsequently thereto, the fuzzy feature can then be determined. It can firstly be checked whether the object feature and the fuzzy feature describe the same object in the surroundings. It can thus be checked whether the fuzzy feature and the object feature can be fused with one another. In this case, firstly an association can take place, which is used to check whether fusing or merging of the fuzzy feature with the further object feature is reasonable. During this merging, a merged or updated object feature can be determined proceeding from the object feature. This merged object feature is determined on the basis of the fuzzy object feature. The object can thus be detected more reliably.

In one embodiment, a linear mapping rule, which comprises the innovation function and an amplification factor for the innovation function, is determined for determining the merged object feature from the further object feature, wherein the amplification factor is dependent on a spatial uncertainty of the further object feature and a spatial uncertainty of the fuzzy feature. To determine the merged object feature, the linear mapping rule is ascertained. This mapping rule can also be referred to as a filter. In principle, the mapping rule can be defined like a Kalman filter. The mapping rule can contain the innovation function and the amplification factor, by which the innovation function is multiplied. This amplification factor can also be referred to as a Kalman amplification. The amplification factor can be determined as a function of the respective spatial uncertainty of the further object feature and the fuzzy feature. The spatial uncertainty can be determined with the aid of the covariance or the covariance matrix of the respective states or features. The merged object feature can thus be determined in consideration of the spatial uncertainty.

Furthermore, it is advantageous if the amplification factor is determined such that a spatial uncertainty of the merged object feature is minimal. To be able to determine the merged object feature as reliably as possible, the amplification factor can be determined such that the spatial uncertainty of the merged object feature is as small as possible. The amplification factor can thus be determined such that the covariance matrix of the merged object feature is minimal. The covariance matrix can be minimized, for example, in that the eigenvalues of the covariance matrix are minimized. In this case, the covariance matrix can be transformed using an arbitrary unity vector and this scalar projection can subsequently be minimized. The amplification factor can thus be reliably determined.

It can also be provided that a limit is determined on the basis of the innovation function and the fuzzy feature remains unconsidered in the determination of the merged object feature if the innovation function exceeds the limit. The innovation function can be used to decide whether the fuzzy feature and the object feature should be merged. In particular, the expectation of the innovation function and/or the covariance of the innovation function can be determined. A limit, which is also referred to as a Mahalanobis distance, can be derived therefrom. If the Mahalanobis distance of an innovation is less than this limit, the merged object feature can be determined. The innovation describes the output of the innovation function in this case. For the case in which the innovation is greater than this limit, the fuzzy feature cannot be considered.

A point feature or a line feature is preferably determined as the further object feature. Such a point feature can be determined, for example, in that the object is detected by the first sensor and/or the second sensor at multiple chronologically successive points in time or in multiple chronologically successive measurements. The relative position between the first and/or the second sensor in relation to the object can be determined with the aid of triangulation, for example. The further object feature can also be a line or a line feature, which describes a border of an object or a part thereof. Such a line feature is obtained, for example, when the motor vehicle moves past the object and measurements are carried out in an ongoing manner as it moves past. The respective measured values or sensor data which describe the distance to the object can then be combined to form a line feature. It can also be provided that a plurality of measured values is determined and a line is laid through the measured values in order to obtain the line feature.

Furthermore, it is advantageous if a measurement model, which describes a distance between the fuzzy feature and the point feature or a distance between the fuzzy feature and the line feature, is determined to determine the innovation function. The measurement model can map in particular a measurement space. If the further object feature is the point feature, in particular a generated ellipse is determined to determine the measurement model such that the point feature lies on the generated ellipse. A generated ellipse, which can also be referred to as a measurement ellipse, is thus determined to determine the measurement model. This generated ellipse is determined on the basis of the ellipse which describes the fuzzy feature and/or the measurement. In this case, the generated ellipse and the ellipse preferably have the same focal points. This generated ellipse is determined such that the point feature lies on the generated ellipse. It is thus checked how a fuzzy feature has to appear in the form of an ellipse if the point feature is measured as the object using this ellipse. Since the ellipse and the generated ellipse have the same focal points, the innovation describes the difference between the lengths of the semi-major axes. The measurement model describes half of the route from the position of the first sensor via the point feature to the position of the second sensor. Half of this route corresponds to the semi-major axis. This enables a simple determination of the measurement model for the case in which the object feature is the point feature.

If the further object feature is the line feature, in particular a generated ellipse is determined to determine the measurement model such that the line feature extends tangentially to the generated ellipse. In principle, the generated ellipse could be determined to determine the measurement model such that it intersects with the line feature. However, two intersection points result therefrom, whereby a unique solution cannot be determined. Therefore, the generated ellipse is determined such that it only has a single intersection point with the line feature. This is the case if the line feature extends tangentially to the generated ellipse. The measurement model can thus also be determined in a simple manner for the case in which the object feature is the line feature.

An innovation which describes an output of the innovation function is preferably determined on the basis of a difference between the length of the semi-major axis of the ellipse and the measurement model. As already explained, the measurement model describes the length of the semi-major axis of the generated ellipse. This can be compared to the length of the semi-major axis of the ellipse which was determined as a fuzzy feature. It can thus be determined how the ellipse as the fuzzy feature or the measured ellipse differs from the generated ellipse. The similarity between the fuzzy feature or the ellipse and the object feature, the point feature, or the line feature can thus be determined in a simple manner.

A controller according to the invention for a driver assistance system of a motor vehicle is designed to carry out a method according to the invention. The controller can comprise a computer, a microprocessor, a digital signal processor, or the like. The controller is preferably formed by an electronic control unit of the motor vehicle.

A driver assistance system according to the invention for a motor vehicle comprises a controller according to the invention and also a first sensor and a second sensor, which are in particular ultrasound sensors. The controller is connected to the first and the second sensor for data transmission. The first sensor serves in this case as a transmitter for emitting the sensor signal. The second sensor serves as a receiver for receiving the sensor signal reflected from the at least one object. It can also be provided that the driver assistance system has further sensors, which can be an ultrasound sensor, a camera, a radar sensor, a lidar sensor, a laser scanner, or the like.

A further embodiment relates to a method for detecting at least one object in surroundings of a motor vehicle. In this case, a first sensor is preferably actuated to emit a sensor signal. Furthermore, in particular sensor data are received by a second sensor, which describe the sensor signal reflected from the at least one object. Furthermore, it is preferably provided that a fuzzy feature is determined from the sensor data as an object feature for describing the at least one object, wherein the fuzzy feature describes a distance between the at least one object and a position of the first sensor and/or a position of the second sensor. In particular, the fuzzy feature is described as an ellipse, wherein focal points of the ellipse are determined on the basis of the position of the first sensor and the second sensor. Furthermore, a semi-major axis of the ellipse is preferably determined on the basis of a runtime of the sensor signal and a length of a semi-minor axis of the ellipse is determined in particular on the basis of the focal points and the length of the semi-major axis.

A motor vehicle according to the invention comprises a driver assistance system according to the invention. The motor vehicle is designed in particular as a passenger vehicle.

The preferred embodiments presented with reference to the method according to the invention and the advantages thereof apply accordingly to the controller according to the invention, the driver assistance system according to the invention, and the motor vehicle according to the invention.

Further features of the invention result from the claims, the figures, and the description of the figures. The features and combinations of features mentioned above in the description, and also the features and combinations of features mentioned hereafter in the description of the figures and/or solely shown in the figures are usable not only in the respectively specified combination, but rather also in other combinations or alone, without departing from the scope of the invention. Therefore, embodiments of the invention are also to be considered to be comprised and disclosed which are not explicitly shown in the figures and explained but originate and can be produced by separate combinations of features from the explained embodiments. Embodiments and combinations of features are also to be considered to be disclosed which therefore do not have all features of an originally formulated independent claim. In addition, embodiments and combinations of features are to be considered to be disclosed, in particular by the above-described embodiments, which go beyond or deviate from the combinations of features represented in the references of the claims.

The invention will now be explained in greater detail on the basis of preferred exemplary embodiments and with reference to the appended drawings.

In the figures.

In the figures, identical and functionally identical elements are provided with identical reference signs.

Figure 1:
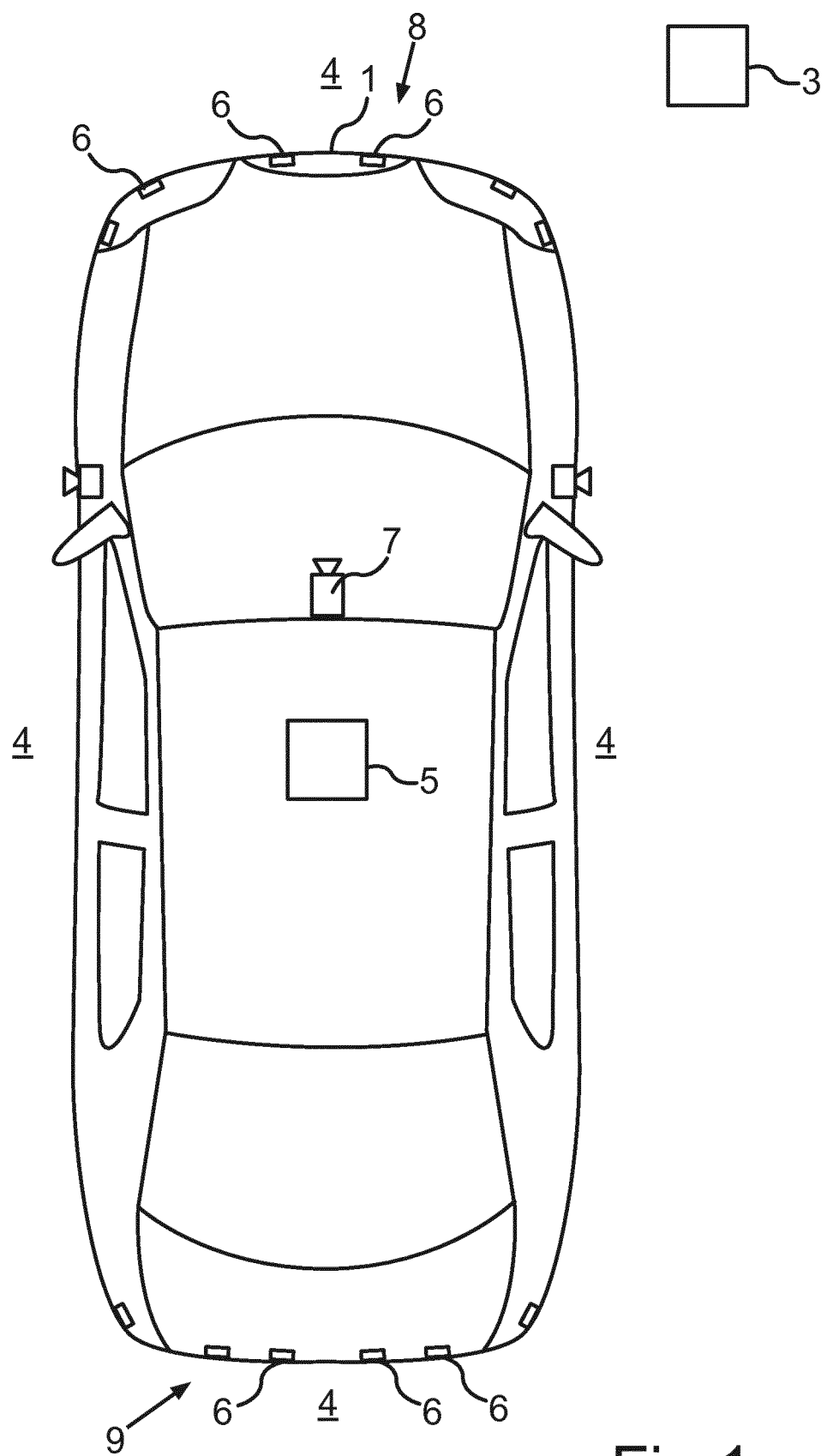
FIG. 1 shows a motor vehicle according to one embodiment of the invention, which comprises a driver assistance system having a plurality of sensors for detecting an object.

FIG. 1 shows a motor vehicle 1 according to one embodiment of the present invention in a top view. The motor vehicle 1 is designed in the present case as a passenger vehicle. The motor vehicle 1 comprises a driver assistance system 2, using which at least one object 3 in surroundings 4 of the motor vehicle 1 can be detected.

The driver assistance system 2 comprises a controller 5, which can be formed, for example, by an electronic control unit (ECU) of the motor vehicle 1. In addition, the driver assistance system 2 comprises a plurality of sensors 6, 7. The sensors 6, 7 can be, for example, ultrasound sensors, cameras, radar sensors, lidar sensors, laser scanners, or the like. In the present exemplary embodiment, the driver assistance system 2 comprises twelve ultrasound sensors 6, six of which are arranged in a front region 8 and six of which are arranged in a rear region 9 of the motor vehicle 1. The ultrasound sensors 6 can be arranged, for example, on the bumpers of the motor vehicle 1. An ultrasonic signal can be emitted by the respective ultrasound sensors 6 and the ultrasonic signal reflected from the object 3 can be received. An indirect measurement can also be carried out, in which one of the ultrasound sensors 6 emits the ultrasonic signal and an adjacent ultrasound sensor 6 receives the ultrasonic signal reflected from the object 3.

In addition, the driver assistance system 2 comprises a camera 7, by means of which the object 3 can be detected. An analysis unit, by means of which the images of the camera 7 can be analysed, can be connected downstream of the camera 7. The object 3 can be recognized, for example, using a corresponding object recognition algorithm. The ultrasound sensors 6 and the camera 7 are each connected to the controller 5 for data transmission. Corresponding data lines are not shown for the sake of comprehensibility in the present case. Measurements can be carried out by each of the sensors 6, 7, in which measurements sensor data are generated. These sensor data can then be transmitted by the respective sensors 6, 7 to the controller 5.

The controller 5 can determine an object feature $x_P$, $x_L$, $x_U$, which describes the object 3, on the basis of the sensor data which it has received from one of the sensors 6, 7. It can also be provided that the sensors 6, 7 determine the object features themselves and then transmit them to the controller 5. The determination of the object features $x_P$, $x_L$, $x_U$ can take place in a so-called feature extraction level. For this purpose, measured values of the sensor data of similar sensors can be combined or merged. The object features $x_P$, $x_L$, $x_U$ can be entered, for example, in a digital surroundings map, which describes the surroundings 4 of the motor vehicle 1. The extracted object features $x_P$, $x_L$, $x_U$, which originate from different sensors, can first be fused in the surroundings map or the feature extraction level. The object features $x_P$, $x_L$, $x_U$ can be point features $x_P$, line features $x_L$, or fuzzy features $x_U$.

These object features $x_P$, $x_L$, $x_U$ can be updated in the surroundings map. For this purpose, new object features $x_P$, $x_L$, $x_U$ can be determined. If an object feature $x_P$, $x_L$, $x_U$ is already present in the surroundings map and a new object feature $x_P$, $x_L$, $x_U$ is determined, it can firstly be checked whether the new object feature $x_P$, $x_L$, $x_U$ can be associated with the object feature $x_P$, $x_L$, $x_U$ present in the surroundings map. If the object features $x_P$, $x_L$, $x_U$ are associated with one another, the object features $x_P$, $x_L$, $x_U$ can be merged. If no association takes place, the new object feature $x_P$, $x_L$, $x_U$ can be accommodated in the surroundings map.

The object features $x_P$, $x_L$, $x_U$ can be determined from the sensor data of the ultrasound sensors 6. A distance to the object 3 can be determined on the basis of the sensor data of the ultrasound sensors 6. For this purpose, an ultrasound sensor 6 emits an ultrasonic signal and receives the ultrasonic signal reflected from the object 3. The distance can then be determined on the basis of the runtime between the emission of the ultrasonic signal and the reception of the ultrasonic signal reflected from the object 3. If the driver assistance system 2—as shown in the example of FIG. 1—has multiple ultrasound sensors 6, direct and indirect measurements can be carried out using the ultrasound sensors 6.

Figure 2:
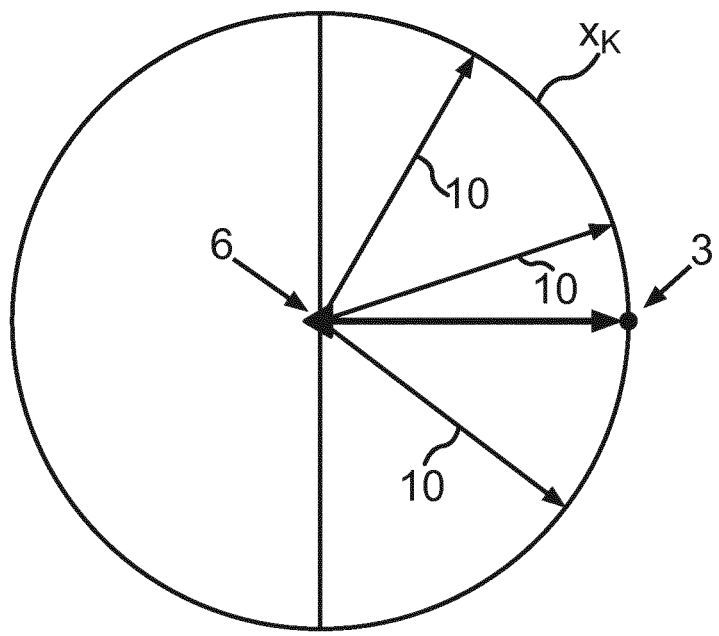
FIG. 2 shows a circle, which is used to describe the position of the object in the case of a direct measurement of the sensors.

A direct measurement of the ultrasound sensor 6 is shown here schematically in FIG. 2. In the case of a direct measurement, the ultrasound sensor 6 emits the ultrasonic signal or the sensor signal and also receives the ultrasonic signal or the echo of the ultrasonic signal reflected from the object 3. It can then be determined from the runtime of the ultrasonic signal that the object 3 lies on a circle $x_K$ or semicircle around the ultrasound sensor 6. The radius of the circle $x_K$ results from half of the runtime of the ultrasonic signal. The arrows 10 describe the signal paths of the sensor signal or the ultrasonic signal in this case.

Figure 3:
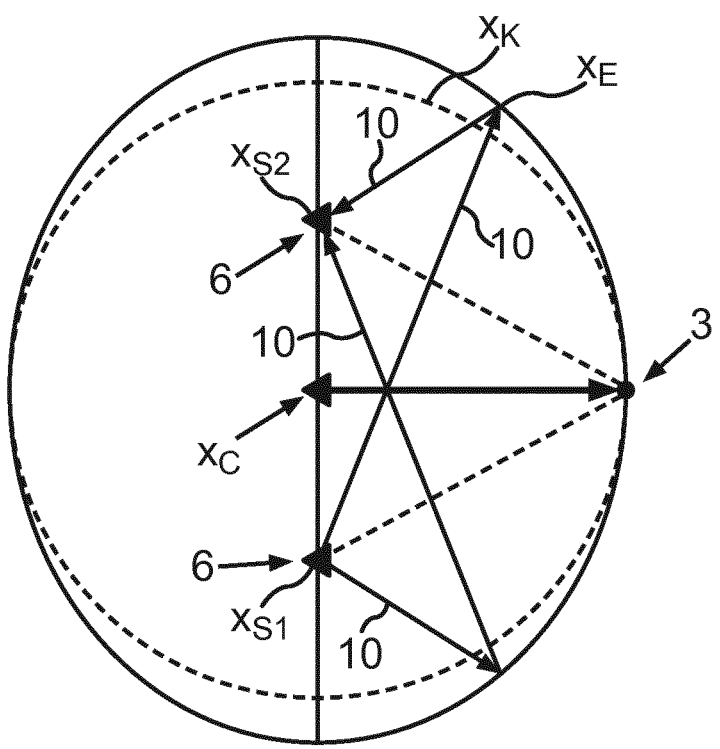
FIG. 3 shows an ellipse, which is used to describe the position of the object in the case of an indirect measurement of the sensors.

An indirect measurement of the ultrasound sensor 6 is schematically illustrated in FIG. 3. In this case, a first ultrasound sensor 6 is operated as a transmitter. This ultrasound sensor 6 is located at a position $x_{s1}$ and emits the ultrasonic signal. A second or adjacent ultrasound sensor 6, which is located at a position $x_{s2}$, is operated as a receiver and receives the ultrasonic signal reflected from the object 3 and which was emitted by the first ultrasound sensor 6. In this case, the object 3 lies on an ellipse $x_E$ or semi-ellipse, wherein the positions $x_{s1}$, $x_{s2}$ of the ultrasound sensors 6 are associated with respective focal points $x_{F1}$ and $x_{F2}$ of the ellipse $x_E$.

As already explained, point features $x_P$ or line features $x_L$ can be determined as object features $x_P$, $x_L$, $x_U$ by the combination of sensor data which were generated in multiple measurements by the ultrasound sensors 6. In some cases, however, it is not possible to determine an object feature $x_P$, $x_L$, $x_U$ with an explicit spatial position. This is the case, for example, if sufficient sensor data are not available. In this case, a fuzzy feature $x_U$ is provided as the object feature $x_P$, $x_L$, $x_U$. In the case of a direct measurement, this is described in that a point is placed on the sensor axis having the measured distance from the sensor position. In the case of an indirect measurement, the ellipse is approximated by a circle, the centre point $x_C$ of which is the mean value of the two sensor positions $x_{s1}$, $x_{s2}$. This centre point $x_C$ is also referred to as the virtual sensor position. The radius of the circle corresponds to the length of the semiminor axis b of the ellipse. This can be described as follows:

$$\text{Radius} = \sqrt{\left(\frac{\text{Runtime distance}}{2}\right)^2 - \left(\frac{\text{Sensor distance}}{2}\right)^2}.$$

In a similar manner, the fuzzy feature $x_U$ is generated on the axis of the virtual sensor using the computed radius. Even if it is not possible to determine point features $x_P$ or line features $x_L$ on the basis of the sensor data, it can be provided that a point feature $x_P$ or a line feature $x_L$ is merged with a fuzzy feature $x_U$.

Point features $x_P$, line features $x_L$, and fuzzy features $x_U$ are described as Gaussian random variables x with the expected value $E[x]=\hat{x}$ and the covariance matrix $\text{Cov}[x]=E[(x-\hat{x})(x-\hat{x})^T]=P$. Accordingly, a point feature $x_P=(x_P,y_P)^T$ is represented by its two-dimensional coordinates in space. A line feature $x_L=(x_l,y_l,\alpha_l)^T$ is described by a base point or pivot point in two-dimensional space and an angle $\alpha_l$ of the line. In the present case, the length of the line is not stochastically modelled. Finally, a fuzzy feature $x_U$ is described by a scalar random variable $x_U=d_u$, wherein $d_u$ is its Euclidean distance from the actual or virtual sensor position $x_S=(x_S,y_S)^T$.

To merge the object features $x_P$, $x_L$, $x_U$, a mapping function in the form of a generic, linear estimator is used:

$$x'_1 = x_1 + Kh(x_1, x_2).$$

In this case, $x_1$ and $x_2$ can be replaced by the above-described object features $x_P$, $x_L$, $x_U$, i.e. a point feature $x_P$, a line feature $x_L$, or a fuzzy feature $x_U$. For this purpose, in particular the merging of a point feature $x_P$ with a fuzzy feature $x_U$ or the merging of a line feature $x_L$ with a fuzzy feature $x_U$ is described hereafter. Two object features $x_P$, $x_L$, $x_U$ are combined by the mapping rule, to obtain further items of information about the already present object feature $x_P$, $x_L$, $x_U$. With the aid of the mapping rule, a merged object feature or a merged state $x'_1$ can be determined from the first state $x_1$ or the first object feature $x_P$, $x_L$, $x_U$. A stochastic innovation function $h(x_1,x_2)$ is used for this purpose.

The innovation function h describes a similarity between the object features $x_P$, $x_L$, $x_U$ and/or the states thereof. The mapping rule or the innovation function h can also be nonlinear. In this case, the innovation function h can then be linearized. This can take place with the aid of a first-order Taylor series:

$$h(x_1, x_2) = h(\widehat{x_1}, \widehat{x_2}) + \frac{\partial h}{\partial x_1}\bigg|_{(x_1,x_2)=(\widehat{x_1},\widehat{x_2})} (x_1 - \widehat{x_1}) + \frac{\partial h}{\partial x_2}\bigg|_{(x_1,x_2)=(\widehat{x_1},\widehat{x_2})} (x_2 - \widehat{x_2})$$

$$= h(\widehat{x_1}, \widehat{x_2}) + H_1(x_1 - \widehat{x_1}) + H_2(x_2 - \widehat{x_2}).$$

In this case, the factors $H_1$ and $H_2$ are the Jacobi matrices. Furthermore, the mapping rule comprises an amplification factor K or an amplification matrix. The amplification factor K is determined in that the projection $e^T P'_1 e$ is minimized, wherein e can be any arbitrary unity vector. The amplification factor K can be described as follows:

$$K = -P_1 H_1^T (H_1 P_1 H_1^T + H_2 P_2 H_2^T)^{-1}.$$

It is taken into consideration in the present case that $x_1$ and $x_2$ are not correlated. Therefore, $E[(x_1-\hat{x}_1)(x_2-\hat{x}_2)^T]=0$ results. The merged result and the updated covariance matrix thus result as:

$$\hat{x}'_1 = \hat{x}_1 + Kh(\widehat{x_1}, \widehat{x_2})$$

$$P'_1 = P_1 + KH_1 P_1.$$

In order to check whether the object features $x_P$, $x_L$, $x_U$ and/or the states are to be associated with one another, the so-called Mahalanobis distance is defined:

$$h(\widehat{x_1}, \widehat{x_2})^T (H_1 P_1 H_1^T + H_2 P_2 H_2^T)^{-1} h(\widehat{x_1}, \widehat{x_2}).$$

A limit is specified by the Mahalanobis distance. If this limit is undershot, an association of the states or object features $x_P$, $x_L$, $x_U$ is plausible. Moreover, further geometric studies can be used to check the plausibility.

To check whether the object features $x_P$, $x_L$, $x_U$ should be associated with one another and merged, a suitable innovation function h is to be determined for the object features $x_P$, $x_L$, $x_U$. Models for the merging of point features $x_P$ with fuzzy features $x_U$ and the merging of line features $x_L$ with fuzzy features $x_U$ are explained hereafter. Both models are determined as the difference between a measurement model $a_P$, $a_L$ and a measured object distance $d_u$ of the fuzzy feature $x_U$. The measurement models $a_P$, $a_L$ can transfer already known object features $x_P$, $x_L$ into a measurement space. In this measurement space, the object features $x_P$, $x_L$, $x_U$ can then be compared to the present measurements.

If a point feature $x_P$ is to be merged with a fuzzy feature $x_U$, the measurement model $a_P$ is the Euclidean distance $d_P$ between the point feature $x_P$ and the sensor position $x_S$. The innovation function h results as:

$$h(x_P, x_U) = d_P(x_P) - d_u = \sqrt{(x_p - x_s)^2 + (y_p - y_s)^2} - d_u$$

$$H_{x_P} = \left[ \frac{\widehat{x_p} - x_s}{\sqrt{(\widehat{x_p} - x_s)^2 + (\widehat{y_p} - y_s)^2}} \quad \frac{\widehat{y_p} - y_s}{\sqrt{(\widehat{x_p} - x_s)^2 + (\widehat{y_p} - y_s)^2}} \right]$$

$$H_{x_U} = -1.$$

If a line feature $x_L$ is to be merged with a fuzzy feature $x_U$, the measurement model $a_L$ is the absolute value of the shortest distance $d_L$ between the line feature $x_L$ and the sensor position $x_S$. The innovation function h results as:

$$h(x_L, x_U) = d_L(x_L) - d_u = \frac{|-\sin\alpha_l(x_l - x_s) + \cos\alpha_l(y_l - y_s)|}{s} - d_u$$

$$H_{x_L} = \text{sign}(\hat{s})[-\sin\hat{\alpha}_l \quad \cos\hat{\alpha}_l \quad -\cos\hat{\alpha}_l(\hat{x}_l - x_s) - \sin\hat{\alpha}_l(\hat{y}_l - y_s)]$$

$$H_{x_U} = -1.$$

A graphic description of the two innovation functions h will be explained in greater detail hereafter.

As described above, fuzzy features $x_U$ are described as circular distance measurements having the distance $d_u$ from a sensor position $x_S$. This model is used independently of the type of measurement by which the fuzzy feature is generated. In the case of a direct measurement by an ultrasound sensor 6, this model describes the items of information, which are present, with respect to the signal path. For indirect measurements by the ultrasound sensor 6, such a model only represents an approximation, the accuracy of which is dependent on how similar the ellipse is to a circle.

To lift this restriction, firstly the description of a fuzzy feature $x_U$ is expanded to also be able to store items of information from an indirect measurement. Furthermore, the innovation function h is determined in order to be able to combine point features $x_P$ and line features $x_L$ with fuzzy features $x_U$ in the form of the elliptical distance measurements.

Figure 4:
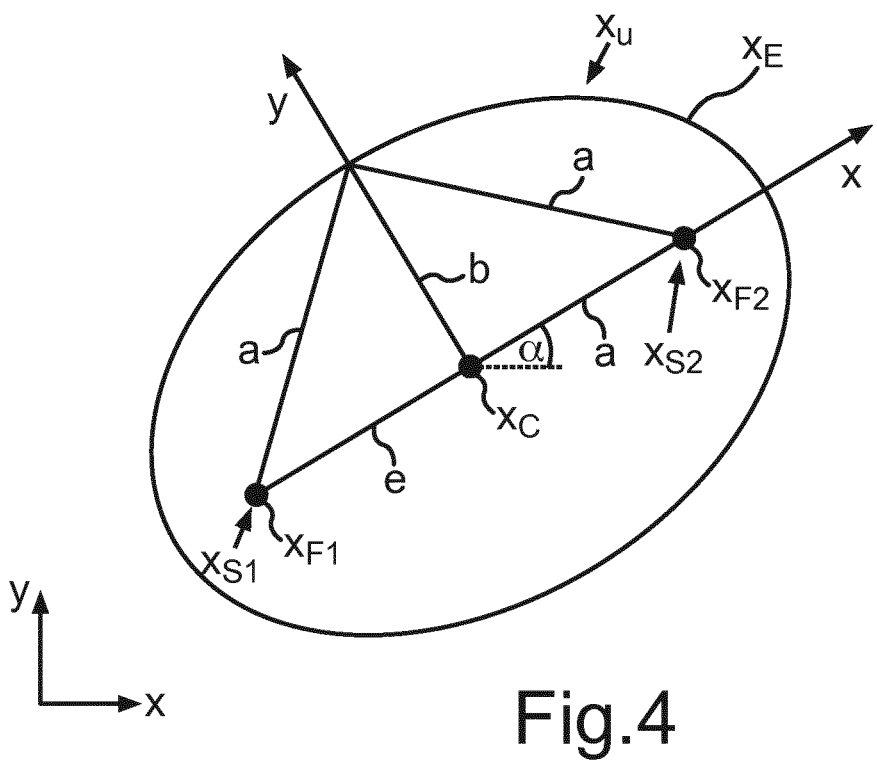
FIG. 4 shows the ellipse from FIG. 3 in a further embodiment.

FIG. 4 shows a schematic illustration of an ellipse $x_E$ as a fuzzy feature $x_U$. An ellipse $x_E$ can be described mathematically in various ways. A typical description is to consider an ellipse $x_E$ as a set of points, the total of which corresponds to the Euclidean distances to the two focal points $x_{F1}=(x_{f1},y_{f1})^T$ and $x_{F2}=(x_{f2},y_{f2})^T$ of the length of the main major axis $2a$:

$$E = \{x | \overline{xx_{F1}} + \overline{xx_{F2}} = 2a\}.$$

The advantage of this description is that it is independent of any Cartesian coordinate system. Moreover, the ellipse $x_E$ can be described by the implicit ellipse equation using the semi-major axis a and the semi-minor axis b:

$$\frac{(x^e)^2}{a^2} + \frac{(y^e)^2}{b^2} - 1 = 0.$$

This equation is described in the coordinate system of the ellipse $x_E$, in which the x axis is oriented on the semi-major axis a and the y axis is oriented on the semi-minor axis b. The ellipse $x_E$ is inclined at an angle $\alpha$ in this case. A further property of the ellipse $x_E$ is the so-called linear eccentricity e:

$$e = \sqrt{a^2 - b^2}.$$

The linear eccentricity e describes the distance between each focal point $x_{F1}$, $x_{F2}$ and the centre point $x_C=(x_C, y_C)^T$ of the ellipse $x_E$. The linear eccentricity e is delimited by $0 \leq e < a$. For the case $e=0$, that the eccentricity is 0, the ellipse $x_E$ would be a circle. If $e=a$, the ellipse $x_E$ would degenerate to a line.

To obtain an expanded description of a fuzzy feature $x_U$, all available items of information on the indirect measurement of the ultrasound sensors 6 have to be transferred to the digital surroundings map from the feature extraction layer. For example, the positions $x_S$ of the two ultrasound sensors 6 and the items of information on the runtime of the ultrasound sensor have to be known. The length of the semi-major axis a can then be determined from the runtime: a=runtime distance/2. The eccentricity e can be determined from the distance of the ultrasound sensors 6: e=sensor distance/2. The length of the semi-minor axis b can then be determined therefrom: $b=\sqrt{a^2-e^2}$, wherein the length b of the semi-minor axis is not required during the fusion.

It is presumed in this case that the distance between the ultrasound sensors 6 or the sensor distance is completely known. This can be stored, for example, in a memory of the controller 5. The uncertainty of the measurement is reflected in the length of the semi-major axis a and the length of the semi-minor axis b. Since the lengths of the two semi-axes a, b are different from one another and are dependent on the linear eccentricity e, the uncertainty of the ellipse $x_E$ is completely reflected by the consideration of a single scalar random variable a or b for the semi-axes. Since the ultrasound sensors â are used to measure directly, a fuzzy feature $x_U$ is stochastically determined by the length of the semi-major axis a. Therefrom, $x_U = a_u$ results, wherein $a_u$ is modelled as a Gaussian curve. In addition, either both sensor positions $x_S$, which are described by the focal points $x_{F1}$ and $x_{F2}$, or a merging of the centre point $x_C$ of the ellipse, the linear eccentricity e, and the orientation $\alpha$ of the ellipse $x_E$ is required to uniquely specify the fuzzy feature.

To determine the association and the merging, two innovation functions $h(x_P, x_U)$ and $h(x_L, x_U)$ are to be determined, using which point features $x_P$ and line features $x_L$ can be merged with fuzzy features $x_U$. The innovation functions h are determined such that they take into consideration a difference between a measurement model a(x) and the semi-major axis a of the measured ellipse $x_E$:

$$h(x, x_U) = h(x, a_u) = a(x) - a_u.$$

In this case, the state x can be replaced by the state of a point feature $x_P$ or the state of a line feature $x_L$. The measurement model $a_P(x_P)$ can determine the length of the semi-major axis a of a generated ellipse $x'_E$, on which the point feature $x_P$ would lie if it were measured using the ultrasound sensor 6 or multiple ultrasound sensors 6. If a line feature $x_L$ is to be merged with the fuzzy feature $x_U$, the measurement model $a_L(x_L)$ determines the length of the semi-major axis a of the generated ellipse $x_E$, to which the line feature $x_L$ would extend tangentially. It can be taken into consideration in this case that the line feature $x_L$ was determined from a measurement using the same ultrasound sensors 6, from the measurement of which the fuzzy feature $x_U$ was also determined.

Figure 5:
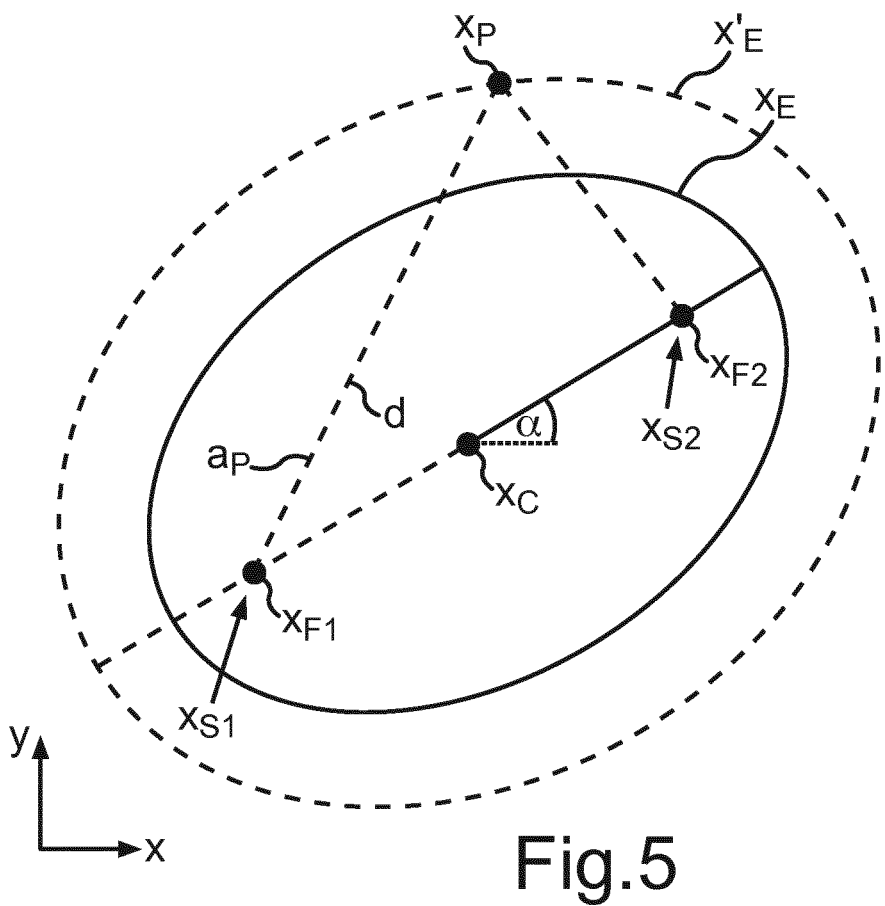
FIG. 5 shows a schematic illustration of the ellipse and a point feature, wherein the point feature and the ellipse are to be merged.

The determination of the measurement models for the point features $x_P$ and line features $x_L$ will be explained hereafter. The determination of the measurement model $a_P$ for the merging of the point feature $x_P$ with the ellipse $x_E$ will be explained on the basis of FIG. 5, which shows a schematic illustration of the point feature $x_P$ and the ellipse $x_E$. In the case of a point feature $x_P$, the measurement model is derived from the following definition:

$$\overline{x_P x_{F1}} + \overline{x_P x_{F2}} = 2a.$$

To determine the measurement model $a_P$, in the present case the generated ellipse $x'_E$ is determined. This generated ellipse $x'_E$ is determined such that the point feature $x_P$ lies on the generated ellipse $x'_E$. The length of the semi-major axis a of the generated ellipse $x'_E$ can be determined therefrom:

$$a = \frac{\overline{x_P x_{F1}} + \overline{x_P x_{F2}}}{2} = \frac{\sqrt{(x_{f1} - x_P)^2 + (y_{f1} - y_P)^2} + \sqrt{(x_{f2} - x_P)^2 + (y_{f2} - y_P)^2}}{2}.$$

This applies for a>e. If the condition a=e is met, the point feature $x_P$ lies on the line which connects the focal points $x_{F1}$, $x_{F2}$ to one another. In this case, a valid measurement cannot be derived from the point feature $x_P$. Valid ellipses can be determined for all other point features $x_P$. The measurement model $a_P$ results from half of the route which extends from the first focal point $x_{F1}$ via the point feature $x_P$ to the second focal point $x_{F2}$.

This model is used for the innovation function h:

$$h(x_P, x_U) = a_P(x_P) - a_u = \frac{\sqrt{(x_{f1} - x_P)^2 + (y_{f1} - y_P)^2} + \sqrt{(x_{f2} - x_P)^2 + (y_{f2} - y_P)^2}}{2} - a_u.$$

After the linearization of the innovation function h, the Jacobi matrices $H_{x_P}$ and $H_{x_U}$ can be determined:

$$H_{x_P} = \frac{1}{2}\left[\frac{\widehat{x_p^-} - x_{f1}}{\overline{\widehat{x_p} x_{F1}}} + \frac{\widehat{x_p^-} - x_{f2}}{\overline{\widehat{x_p} x_{F2}}} \quad \frac{\widehat{y_p^-} - y_{f1}}{\overline{\widehat{x_p} x_{F1}}} + \frac{\widehat{y_p^-} - y_{f2}}{\overline{\widehat{x_p} x_{F2}}}\right]$$

$$H_{x_U} = -1.$$

The Jacobian matrix $H_{x_P}$ is defined for all points except $\widehat{x_P} = x_{F1}$ or $\widehat{x_P} = x_{F2}$. However, this cannot occur if $a_P(\widehat{x_P}) > e$.

Figure 6:
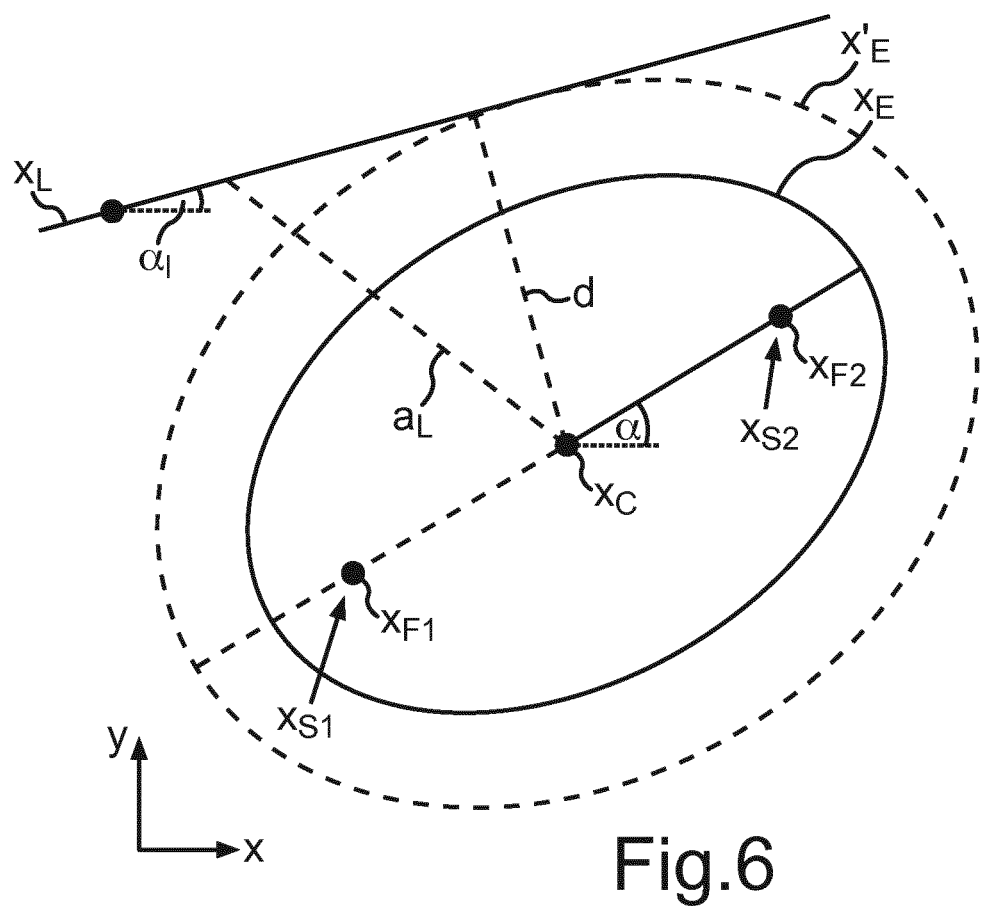
FIG. 6 shows a schematic illustration of the ellipse and a line feature, wherein the line feature and the ellipse are to be merged.

The determination of the measurement model $a_L$ for the merging of the line feature $x_L$ with the ellipse $x_E$ will be explained on the basis of FIG. 6, which shows a schematic illustration of the line feature $x_L$ and the ellipse $x_E$. The measurement model $a_L$ for a line feature $x_L$ can be determined by intersecting the line feature $x_L$ with the generated ellipse $x'_E$. An indirect measurement by ultrasound sensors of a real object in the form of a line would result in an elliptical measurement which extends tangentially to the line. This means that the line or the line feature $x_L$ has to extend tangentially to the generated ellipse $x'_E$. In a first step, the solution is derived from a line feature $x_L$ which is present in the local coordinate system of the generated ellipse $x'_E$. The measurement model $a_L$ can then be expanded such that line features $x_L$ can be used in every Cartesian coordinate system.

To determine the intersection points, the line or the line feature $x_L$ is described in the explicit parameter form:

$$\begin{bmatrix} x^e \\ y^e \end{bmatrix} = \begin{bmatrix} x_l^e \\ y_l^e \end{bmatrix} + t \begin{bmatrix} \cos \alpha_l^e \\ \sin \alpha_l^e \end{bmatrix}.$$

This is inserted into the implicit ellipse equation:

$$0 = \frac{(x^e)^2}{a^2} + \frac{(y^e)^2}{b^2} - 1$$

$$0 = \frac{(x_l^e + t \cos \alpha_l^e)^2}{a^2} + \frac{(y_l^e + t \sin \alpha_l^e)^2}{b^2} - 1.$$

The equation is solved for a parameter t, since the intersection points can be derived therefrom. Since the equation is quadratic, it is brought into the form of the general quadratic equation. It is then solved:

$$0 = t^2 + 2\underbrace{\frac{b^2 x_l^e \cos \alpha_l^e + a^2 y_l^e \sin \alpha_l^e}{b^2(\cos \alpha_l^e)^2 + a^2(\sin \alpha_l^e)^2}}_{p} t + \underbrace{\frac{b^2(x_l^e)^2 + a^2(y_l^e)^2 - a^2 b^2}{b^2(\cos \alpha_l^e)^2 + a^2(\sin \alpha_l^e)^2}}_{q}$$

$$t_{1,2} = -p \pm \sqrt{p^2 - q}.$$

To obtain a unique solution, the discriminant has to be 0:

$$0 = p^2 - q.$$

This specification can be solved for a by inserting p and q and replacing $b^2 = a^2 - e^2$ with:

$$a^2 = (x_l^e \sin \alpha_l^e - y_l^e \cos \alpha_l^e)^2 + (e \cos \alpha_l^e)^2$$

-continued $$a = \sqrt{(x_l^e \sin \alpha_l^e - y_l^e \cos \alpha_l^e)^2 + (e \cos \alpha_l^e)^2}.$$

This solution for computing the length of the semi-major axis a applies for line features $x_L$ which are defined in the local coordinate system of the ellipse $x_E$. Therefore, in general the line feature $x_L$ has to be transformed into the local coordinate system of the ellipse $x_E$:

$$\begin{bmatrix} x_l^e \\ y_l^e \end{bmatrix} = \begin{bmatrix} \cos \alpha & -\sin \alpha \\ \sin \alpha & \cos \alpha \end{bmatrix}^T \begin{bmatrix} x_l - x_c \\ y_l - y_c \end{bmatrix}$$

$$\alpha_l^e = \alpha_l - \alpha.$$

By inserting the transformations into the solution, the following results:

$$a = \sqrt{\left( [\sin(\alpha_l - \alpha) \ -\cos(\alpha_l - \alpha)] \begin{bmatrix} \cos \alpha & -\sin \alpha \\ \sin \alpha & \cos \alpha \end{bmatrix}^T \begin{bmatrix} x_l - x_c \\ y_l - y_c \end{bmatrix} \right)^2 + (e \cos(\alpha_l - \alpha))^2}.$$

Finally, the series vector is rewritten as:

$$[\sin(\alpha_l - \alpha) \ -\cos(\alpha_l - \alpha)] =$$
$$[\sin \alpha_l \cos \alpha - \cos \alpha_l \sin \alpha \ -\sin \alpha_l \sin \alpha - \cos \alpha_l \cos \alpha] =$$
$$[\sin \alpha_l \ -\cos \alpha_l] \begin{bmatrix} \cos \alpha & -\sin \alpha \\ \sin \alpha & \cos \alpha \end{bmatrix}$$

and also inserted. This results in:

$$a = \sqrt{\left( [\sin \alpha_l \ -\cos \alpha_l] \underbrace{\begin{bmatrix} \cos \alpha & -\sin \alpha \\ \sin \alpha & \cos \alpha \end{bmatrix} \begin{bmatrix} \cos \alpha & -\sin \alpha \\ \sin \alpha & \cos \alpha \end{bmatrix}^T}_{I} \begin{bmatrix} x_l - x_c \\ y_l - y_c \end{bmatrix} \right)^2 + (e \cos(\alpha_l - \alpha))^2}$$

$$= \sqrt{(\sin \alpha_l (x_l - x_c) - \cos \alpha_l (y_l - y_c))^2 + (e \cos(\alpha_l - \alpha))^2}.$$

It is to be noted that a rotation of the tilt position of the line feature $x_L$ in the first term completely disappears, and that only an angle transformation is required in the second term. A rotation of the point feature $x_P$ is not required, since the first expression is the square of the shortest distance between the line feature $x_L$ and the centre point $x_C$ of the ellipse $x_E$ and this is invariant. The obtained solution is only valid if a>e. If this condition does not apply, the line feature $x_L$ intersects with the line segment between the two focal points $x_{F1}$, $x_{F2}$. In this case, a correct ellipse $x_E$ cannot be derived from the line feature $x_L$.

In geometrical terms, the measurement model $a_L$ is determined by the projection of one of the focal points $x_{F1}$, $x_{F2}$ on the line feature $x_L$ and the computation of its Euclidean distance d to the centre point $x_C$ of the ellipse $x_E$. It can easily be shown by this approach that the condition a=e is maintained if the line feature $x_L$ lies on one or both focal points $x_{F1}$, $x_{F2}$.

The above-described solution is used for the innovation function h, which is described as follows:

$$h(x_L, x_U) = a_L(x_L) - a_u =$$
$$\sqrt{\underbrace{(\sin \alpha_l(x_l - x_c) - \cos \alpha_l(y_l - y_c))^2}_{s_1} + \underbrace{(e \cos(\alpha_l - \alpha))^2}_{s_2}} - a_u.$$

Furthermore, the Jacobi matrices are determined:

$$H_{x_L} =$$
$$\frac{1}{a_L(\hat{x_L})} [\hat{s_1} \sin \hat{\alpha}_l \ \ -\hat{s_1} \cos \hat{\alpha}_l \ \ \hat{s_1} (\cos \hat{\alpha}_l(\hat{x}_l - x_c) + \sin \hat{\alpha}_l(\hat{y}_l - y_c)) - $$
$$\hat{s_2} e \sin(\hat{\alpha}_l - \alpha)]$$

$$H_{x_U} = -1.$$

The Jacobian matrix $H_{x_L}$ is defined for all cases except $a_L(\hat{x_L})=0$. In this case, the line feature $x_L$ is perpendicular to the main axis of the ellipse $x_E$ and extends through the centre point $x_C$ of the ellipse $x_E$. This case was already precluded by the specification $a_L(\hat{x_L})>e$.

Finally, it is shown that the determined innovation functions h for the ellipses $x_E$ is a generalization of the already existing models for circles. For the special case of a circle, for which: e=0 or $x_{F1}=x_{F2}=x_C=x_S$, the above-described measurement models are mathematically equal:

$$a_P(x_P) =$$
$$\frac{\overline{x_P x_S} + \overline{x_P x_S}}{2} = \overline{x_P x_S} = \sqrt{(x_p - x_s)^2 + (y_p - y_s)^2} = d_P(x_P)$$

$$a_L(x_L) = \sqrt{(\sin \alpha_l (x_l - x_s) - \cos \alpha_l (y_l - y_s))^2}$$
$$= |\sin \alpha_l (x_l - x_s) - \cos \alpha_l (y_l - y_s)|$$
$$= |-\sin \alpha_l (x_l - x_s) + \cos \alpha_l (y_l - y_s)| = d_L(x_L).$$

It is to be noted that the normal of the existing measurement model for lines points in the opposite direction.

In the present case, an indirect measurement on the basis of ultrasound sensors 6 was explained. It can also be provided that the sensor data of further sensors of the motor vehicle 1 are used. For example, object features can be generated from the measurements of the camera 7 and entered in the surroundings map. The object 3 can be reliably detected in this manner.

The invention claimed is:

1. A method for detecting at least one object in surroundings of a motor vehicle, the method comprising:
   actuating a first sensor to emit a sensor signal;
   receiving sensor data from a second sensor, which describe the sensor signal reflected from the at least one object;
   generating a fuzzy feature from the sensor data as an object feature for describing the at least one object, wherein the fuzzy feature describes a distance between the at least one object and the first sensor and a distance between the at least one object and the second sensor, wherein the fuzzy feature is described as an ellipse;
   generating a further object feature, which describes the at least one object on the basis of sensor data of at least one further measurement of the first and/or the second sensor; and transferring the further object feature and the fuzzy feature into a common coordinate system;

determining, based on an innovation function that describes a similarity between the fuzzy feature and the further object feature, that the fuzzy feature and the further object feature are associated with a single object of the at least one object; and generating, in response to said determining, a merged object feature from the fuzzy feature and the further object feature, wherein the merged object feature improves reliability of detecting the at least one object in the surroundings of the motor vehicle.

2. The method according to claim 1, wherein focal points of the ellipse are determined on the basis of a position of the first sensor and a position of the second sensor, a length of a semi-major axis of the ellipse is determined on the basis of a runtime of the sensor signal and a length of a semi-minor axis of the ellipse is determined on the basis of the focal points and the length of the semi-major axis.

3. The method according to claim 2, wherein an eccentricity of the ellipse is determined on the basis of a distance of the focal points and the length of the semi-minor axis is determined from the length of the semi-major axis and the eccentricity.

4. The method according to claim 1, wherein the further object feature is determined and entered in a digital surroundings map, which describes the surroundings of the motor vehicle, and subsequently the fuzzy feature is determined and entered in the surroundings map.

5. The method according to claim 1, wherein to determine the merged object feature from the further object feature, a linear mapping rule is determined, which comprises the innovation function and an amplification factor for the innovation function, wherein the amplification factor is dependent on a spatial uncertainty of the further object feature and a spatial uncertainty of the fuzzy feature.

6. The method according to claim 5, wherein the amplification factor is determined such that a spatial uncertainty of the merged object feature is minimal.

7. The method according to claim 1, wherein a point feature or a line feature is determined as the further object feature.

8. The method according to claim 1, wherein to determine the innovation function, a measurement model is determined, which describes a distance between the fuzzy feature and a point feature or a distance between the fuzzy feature and a line feature.

9. The method according to claim 8, wherein when the further object feature is the point feature, to determine the measurement model a generated ellipse is determined such that the point feature lies on the generated ellipse.

10. The method according to claim 8, wherein when the further object feature is the line feature, to determine the measurement model a generated ellipse is determined such that the line feature extends tangentially to the generated ellipse.

11. The method according to claim 8, wherein an innovation, which describes an output of the innovation function, is determined on the basis of a difference between the length of the semi-major axis of the ellipse and the measurement model.

12. A controller for a driver assistance system of a motor vehicle, the controller being configured to:

actuate, by a computer processor, a first sensor to emit a sensor signal;

receive, by the computer processor, sensor data from a second sensor, which describe the sensor signal reflected from the at least one object;

generate, by the computer processor, a fuzzy feature from the sensor data as an object feature for describing at least one object, wherein the fuzzy feature describes a distance between the at least one object and the first sensor and a distance between the at least one object and the second sensor, wherein the fuzzy feature is described as an ellipse;

generate, by the computer processor, a further object feature, which describes the at least one object on the basis of sensor data of at least one further measurement of the first and/or the second sensor;

transfer, by the computer processor, the further object feature and the fuzzy feature into a common coordinate system;

determine, by the computer processor based on an innovation function that describes a similarity between the fuzzy feature and the further object feature, that the fuzzy feature and the further object feature are associated with a single object of the at least one object; and generate, by the computer processor in response to said determining, a merged object feature from the fuzzy feature and the further object feature, wherein the merged object feature improves reliability of detecting the at least one object in the surroundings of the motor vehicle.

13. A driver assistance system for a motor vehicle comprising:

a first sensor;

a second sensor; and a controller configured to:

actuate, by a computer processor, a first sensor to emit a sensor signal;

receive, by the computer processor, sensor data from a second sensor, which describe the sensor signal reflected from the at least one object;

generate, by the computer processor, a fuzzy feature from the sensor data as an object feature for describing at least one object, wherein the fuzzy feature describes a distance between the at least one object and the first sensor and a distance between the at least one object and the second sensor, wherein the fuzzy feature is described as an ellipse;

generate, by the computer processor, a further object feature, which describes the at least one object on the basis of sensor data of at least one further measurement of the first and/or the second sensor;

transfer, by the computer processor, the further object feature and the fuzzy feature into a common coordinate system;

determine, by the computer processor based on an innovation function that describes a similarity between the fuzzy feature and the further object feature, that the fuzzy feature and the further object feature are associated with a single object of the at least one object; and generate, by the computer processor in response to said determining, a merged object feature from the fuzzy feature and the further object feature, wherein the merged object feature improves reliability of detecting the at least one object in the surroundings of the motor vehicle.

14. The driver assistance system according to claim 13, wherein the first sensor and the second sensor are ultrasound sensors.

15. A motor vehicle comprising a driver assistance system, wherein the driver assistance system comprises:
- a first sensor;
- a second sensor; and
- a controller configured to:
    - actuate, by a computer processor, a first sensor to emit a sensor signal;
    - receive, by the computer processor, sensor data from a second sensor, which describe the sensor signal reflected from the at least one object;
    - generate, by the computer processor, a fuzzy feature from the sensor data as an object feature for describing at least one object, wherein the fuzzy feature describes a distance between the at least one object and the first sensor and a distance between the at least one object and the second sensor, wherein the fuzzy feature is described as an ellipse;
    - generate, by the computer processor, a further object feature, which describes the at least one object on the basis of sensor data of at least one further measurement of the first and/or the second sensor;
    - transfer, by the computer processor, the further object feature and the fuzzy feature into a common coordinate system;
    - determine, by the computer processor based on an innovation function that describes a similarity between the fuzzy feature and the further object feature, that the fuzzy feature and the further object feature are associated with a single object of the at least one object; and
    - generate, by the computer processor in response to said determining, a merged object feature from the fuzzy feature and the further object feature, wherein the merged object feature improves reliability of detecting the at least one object in the surroundings of the motor vehicle.

* * * * *